United States Patent
Tanabe et al.

(10) Patent No.: US 10,713,106 B2
(45) Date of Patent: Jul. 14, 2020

(54) COMMUNICATION DEVICE, COMMUNICATION METHOD AND NON-TRANSITORY STORAGE MEDIUM

(71) Applicant: Panasonic Intellectual Property Management Co., Ltd., Osaka (JP)

(72) Inventors: Masato Tanabe, Aichi (JP); Jun Anzai, Kanagawa (JP); Manabu Maeda, Osaka (JP); Yoshihiro Ujiie, Osaka (JP); Takeshi Kishikawa, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 148 days.

(21) Appl. No.: 15/770,182

(22) PCT Filed: Dec. 9, 2016

(86) PCT No.: PCT/JP2016/005094
§ 371 (c)(1),
(2) Date: Apr. 20, 2018

(87) PCT Pub. No.: WO2017/104122
PCT Pub. Date: Jun. 22, 2017

(65) Prior Publication Data
US 2018/0314571 A1 Nov. 1, 2018

(30) Foreign Application Priority Data

Dec. 14, 2015 (JP) .................................. 2015-243587
Jun. 24, 2016 (JP) .................................. 2016-125991

(51) Int. Cl.
*G06F 11/00* (2006.01)
*G06F 11/07* (2006.01)
(Continued)

(52) U.S. Cl.
CPC ........ *G06F 11/076* (2013.01); *G06F 11/0709* (2013.01); *H04L 12/40026* (2013.01);
(Continued)

(58) Field of Classification Search
CPC ............... G06F 11/076; G06F 11/0709; G06F 11/0739; G06F 11/3013; H04W 4/48;
(Continued)

(56) References Cited

U.S. PATENT DOCUMENTS 9,843,594 B1 * 12/2017 Evans ................. H04L 63/1425
10,082,787 B2 * 9/2018 Hara .................. G05B 23/0221
(Continued)

FOREIGN PATENT DOCUMENTS

JP 2004-355330 A 12/2004
JP 2007-292489 A 11/2007
(Continued)

OTHER PUBLICATIONS

International Search Report of PCT application No. PCT/JP2016/005094 dated Feb. 28, 2017.

*Primary Examiner* — Joseph D Manoskey
(74) *Attorney, Agent, or Firm* — Greenblum & Bernstein, P.L.C.

(57) ABSTRACT

A communication unit receives a message in a network. A first anomaly detector detects an anomalous message by detecting values of a plurality of monitoring items from the message received by the communication unit and determining whether each of the detected values of the plurality of monitoring items is inside a corresponding first reference range and a corresponding second reference range. The second reference range is narrower than the first reference range. The first anomaly detector detects the message as the anomalous message, when any of the detected values is outside the first reference range, and detects the message as
(Continued)

the anomalous message, when any of the detected values is inside the first reference range and is outside the second reference range and when a predetermined rule is satisfied.

9 Claims, 13 Drawing Sheets

(51) Int. Cl.
H04L 12/24 (2006.01)
H04L 12/40 (2006.01)
H04L 12/26 (2006.01)
H04W 4/48 (2018.01)
H04L 29/06 (2006.01)
H04L 29/08 (2006.01)

(52) U.S. Cl.
CPC .. *H04L 12/40032* (2013.01); *H04L 12/40169* (2013.01); *H04L 41/0681* (2013.01); *H04L 43/16* (2013.01); *H04L 63/1425* (2013.01); *H04L 67/125* (2013.01); *H04W 4/48* (2018.02); *H04L 63/1466* (2013.01); *H04L 2012/40215* (2013.01); *H04L 2012/40273* (2013.01)

(58) Field of Classification Search
CPC ......... H04L 12/40026; H04L 12/40032; H04L 12/40169; H04L 41/0681; H04L 43/16; H04L 63/1425; H04L 63/1466; H04L 67/125; H04L 2012/40215; H04L 2012/40273

See application file for complete search history.

(56) References Cited

U.S. PATENT DOCUMENTS

| 2009/0185503 | A1 | 7/2009 | Tan |
| 2014/0108640 | A1* | 4/2014 | Mathis ................. H04L 41/145 709/224 |
| 2015/0066239 | A1 | 3/2015 | Mabuchi |
| 2015/0227409 | A1* | 8/2015 | Ricken ................ G06F 11/0709 714/47.2 |
| 2015/0358351 | A1 | 12/2015 | Otsuka et al. |

FOREIGN PATENT DOCUMENTS

| JP | 2008-083002 A | 4/2008 |
| JP | 2009-171431 | 7/2009 |
| JP | 2012-043130 A | 3/2012 |
| JP | 2013-131907 | 7/2013 |
| JP | 2014-146868 A | 8/2014 |
| WO | 2014/115455 | 7/2014 |

* cited by examiner

| TRANSFER SOURCE | TRANSFER DESTINATION | ID |
|---|---|---|
| 20a | 20b | * |
| 20b | 20a | 3 |

FIG. 6

| | REFERENCE VALUE COMPARATOR MONITORING ITEM | | | RANGE DETERMINATION UNIT MONITORING ITEM | | | | |
|---|---|---|---|---|---|---|---|---|
| | ID | DATA LENGTH | PAYLOAD (FIXED) | TRANSMISSION PERIOD | TRANSMISSION FREQUENCY | PAYLOAD (FIXED) | PAYLOAD (VARIATION) | |
| REFERENCE PARAMETER VALUE | ○○ | ○○ | ○○ | | | | | |
| FIRST REFERENCE PARAMETER RANGE | | | | ○○~○○ | ○○~○○ | ○○~○○ | ○○~○○ | |
| SECOND REFERENCE PARAMETER RANGE | | | | ○○~○○ | ○○~○○ | ○○~○○ | ○○~○○ | |

323a

COMMUNICATION DEVICE, COMMUNICATION METHOD AND NON-TRANSITORY STORAGE MEDIUM

CROSS-REFERENCE TO RELATED APPLICATIONS

This application is a U.S. national stage application of the PCT International Application No. PCT/JP2016/005094 filed on Dec. 9, 2016, which claims the benefit of foreign priority of Japanese patent applications 2015-243587 filed on Dec. 14, 2015 and 2016-125991 filed on Jun. 24, 2016, the contents all of which are incorporated herein by reference.

TECHNICAL FIELD

The present invention relates to a communication device in a communication system connected via a bus, a communication method, and a communication program.

BACKGROUND ART

A controller area network (CAN) has become widespread as an in-vehicle network. Equipment for in-vehicle use is strongly required to prevent malfunctions. It is therefore necessary to protect equipment connected to the CAN sufficiently against anomalous attacks via the CAN. For example, there is a method of detecting anomalous messages by checking periodicity of messages on the CAN (see, for example, PTL 1). This detection method is required to prevent a legitimate message from being erroneously detected as an anomalous message because of a slight shift in transmission timing of the legitimate message or a slight transmission delay. It is therefore conceivable that a certain margin is provided for a determination parameter.

CITATION LIST

Patent Literature

PTL 1: WO 2014/115455 A

SUMMARY OF THE INVENTION

It is an object of the present invention to provide a technique of reducing detection errors and detection omissions in a well-balanced manner in message anomaly detection in an in-vehicle network.

A communication device according to one aspect of the present invention includes a communication unit configured to transmit and receive a message in a network and a first anomaly detector configured to detect a anomalous message by detecting values of a plurality of first monitoring items from a message received by a communication unit and determining whether each of the detected values of the plurality of first monitoring items is inside a corresponding reference range. A first reference range and a second reference range narrower than the first reference range are set for each of the plurality of first monitoring items. The first anomaly detector determines that the message is the anomalous message when any one of detected values is outside the first reference range. The message is determined as being the anomalous message when any one of detected values is inside the first reference range and is outside the second reference range and when a predetermined rule is satisfied.

Note that arbitrary combinations of above constituent elements and any conversions of expressions of the present invention made among a method, an apparatus, a system, a computer program, a recording medium recording the computer program, and the like are also effective as aspects of the present invention.

According to the present invention, it is possible to reduce detection errors and detection omissions in a well-balanced manner in message anomaly detection in an in-vehicle network.

BRIEF DESCRIPTION OF DRAWINGS

FIG. 6 is a view showing an example of an anomaly detection parameter table held by an anomaly detection parameter storage unit.

DESCRIPTION OF EMBODIMENT

A problem in a conventional device will be briefly described prior to a description of an exemplary embodiment of the present invention. Providing a margin for a determination parameter for detecting an anomalous message will increase a possibility of mistaking, as a legitimate message, an anomalous message that has a period, frequency, or data similar to the legitimate message. In message anomaly detection in an in-vehicle network, it is necessary to reduce both detection errors in determining legitimate as anomalous messages and detection omissions in determining anomaly as legitimate messages.

The exemplary embodiment of the present invention relates to an in-vehicle network system. In recent years, many ECUs have been mounted in a vehicle. The in-vehicle network system connects these many ECUs to allow them to communicate mutually with each other. There are many standards concerning in-vehicle network systems. One of typical in-vehicle network standards is a CAN defined in ISO11898-1.

In the CAN, a communication path is constituted by two buses, and ECUs connected to the buses are called nodes. The respective nodes connected to the buses transmit and receive messages called frames. In the CAN, there are no identifier indicating a transmission destination or transmission source, and a transmission node transmits each frame upon adding an ID called a message ID to the frame (that is, sends a signal to a bus). Each reception node receives a frame transmitted to a bus (that is, reads a signal from the bus), and processes only a necessary frame based on the ID added to the frame.

As described above, many ECUs are disposed in a vehicle and connected to each other via the buses. The respective ECUs operate while exchanging various messages with each other via the CAN. Assume that an ECU having a communication function with the outside has been attacked from the outside, and has become able to transmit attack messages to the CAN. In this case, this ECU can disguise as another ECU to transmit an anomalous message. In addition, if an anomaly program is hidden in firmware in an ECU, the ECU can transmit an attack message to the CAN. Furthermore, if anomaly equipment is connected to an OBD-II port as a diagnostic port or a CAN in a vehicle, an attack message is sometimes transmitted to the CAN. Such attacks anomalously control a vehicle, and hence it is important to protect against these attacks.

Figure 1:
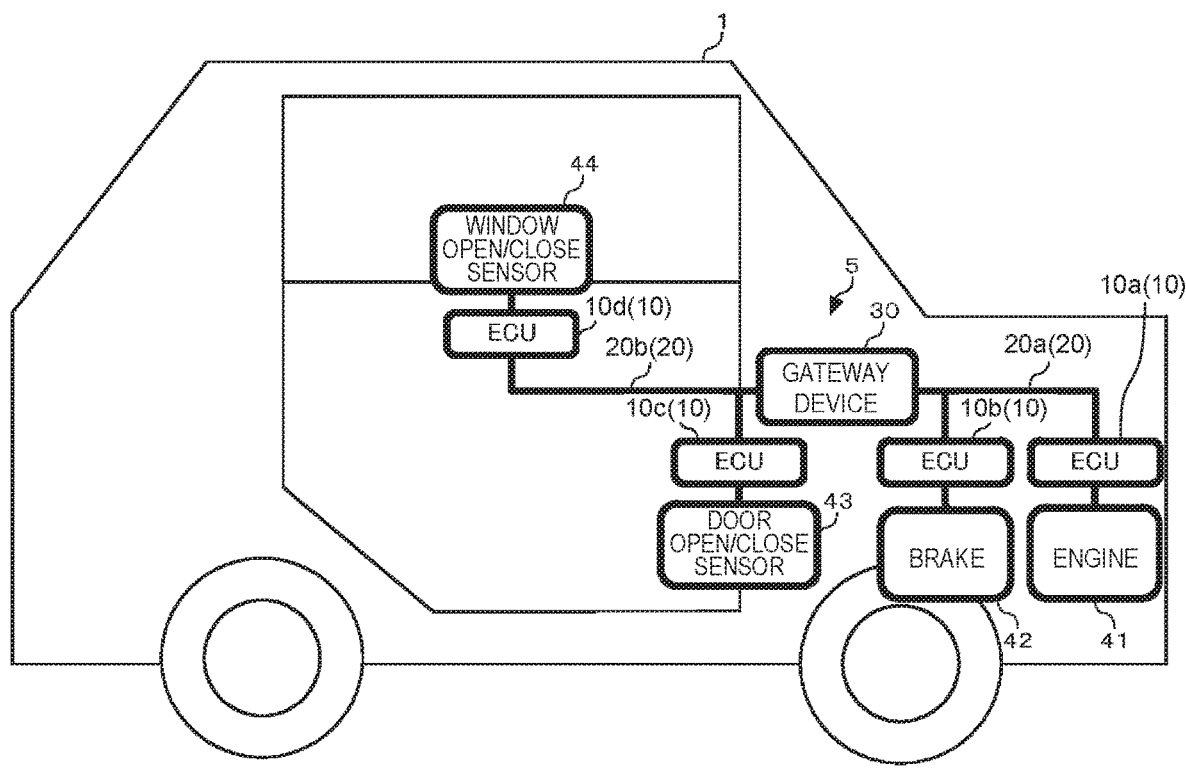
FIG. 1 is a view showing a configuration of an in-vehicle network system built in a vehicle according to an exemplary embodiment of the present invention.

FIG. 1 shows a configuration of in-vehicle network system 5 built in vehicle 1 according to the exemplary embodiment of the present invention. In-vehicle network system 5 includes a plurality of ECUs 10 connected to various equipment and accessories and gateway device 30, which are connected to each other via bus 20.

In the case shown in FIG. 1, first ECU 10a, second ECU 10b, third ECU 10c, and fourth ECU 10d are respectively connected to engine 41, brake 42, door open/close sensor 43, and window open/close sensor 44. First ECU 10a to fourth ECU 10d acquire data respectively indicating their states, and periodically transmit frames containing the data onto bus 20.

First ECU 10a and second ECU 10b are connected to first bus 20a, and third ECU 10c and fourth ECU 10d are connected to second bus 20b. First bus 20a and second bus 20b respectively form subnetwork systems. Gateway device 30 relays a first subnetwork system formed by first bus 20a to a second subnetwork system formed by second bus 20b. Gateway device 30 has a function of transferring a frame received from bus 20 of one subnetwork system to bus 20 of the other subnetwork system. The following will exemplify a case in which a network system complying with a CAN protocol is used as in-vehicle network system 5.

Figure 2:
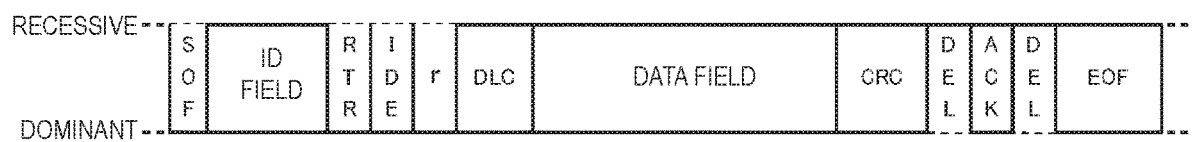
FIG. 2 is a view showing a format of a data frame defined in a CAN protocol.

FIG. 2 shows a format of a data frame defined in the CAN protocol. FIG. 2 shows a data frame in a standard ID format defined in the CAN protocol. The data frame is constituted by start of frame (SOF), an ID field, remote transmission request (RTR), identifier extension (IDE), a reservation bit "r", a data length code (DLC), a data field, a cyclic redundancy check (CRC) sequence, a CRC delimiter "DEL", an acknowledgement (ACK) slot, an ACK delimiter "DEL", and end of frame (EOF).

The SOF is formed from 1 dominant bit. When the buses are idle, the data frame is recessive. By making the data frame dominant using the SOF, the start of transmission of the frame is notified.

The ID field is a field in which an ID (message ID), which is a value formed from 11 bits and indicating a type of data, is stored. The ID is designed such that a frame having a smaller ID value has higher priority to mediate communication using the ID field when a plurality of nodes simultaneously start transmission.

The RTR is a value for distinguishing a data frame and a remote frame. In the data frame, the RTR is formed from 1 dominant bit.

The IDE and the reservation bit "r" each are formed from 1 dominant bit. The DLC is formed from 4 bits and is a value indicating a length of the data field. It is to be noted that the IDE, the reservation bit "r", and the DLC will be collectively referred to as a control field.

The data field is a value formed from up to 64 bits and indicating transmission data. The length of the data field can be adjusted in steps of 8 bits. Specifications of the transmission data are not defined in the CAN protocol but determined by in-vehicle network system 5. The specifications of the transmission data, therefore, depend on a vehicle model, a manufacturer (manufacturing maker), and the like.

The CRC sequence is formed from 15 bits and is calculated from values to be transmitted in the SOF, the ID field, the control field, and the data field. The CRC delimiter is a delimitation sign formed from 1 recessive bit and indicating an end of the CRC sequence. Note that the CRC sequence and the CRC delimiter will be collectively referred to as a CRC field.

The ACK slot is formed from 1 bit. A transmission node performs transmission upon making the ACK slot recessive. Upon normally receiving data up to the CRC sequence, a reception node performs transmission by making the ACK slot dominant. Because dominant data takes priority over recessive data, if the ACK slot is dominant after the transmission, the transmission node can confirm that one of reception nodes has normally received the data frame.

The ACK delimiter is a delimitation sign formed from 1 recessive bit and indicating an end of the ACK. The EOF is formed from 7 recessive bits and indicates an end of the data frame.

Figure 3:
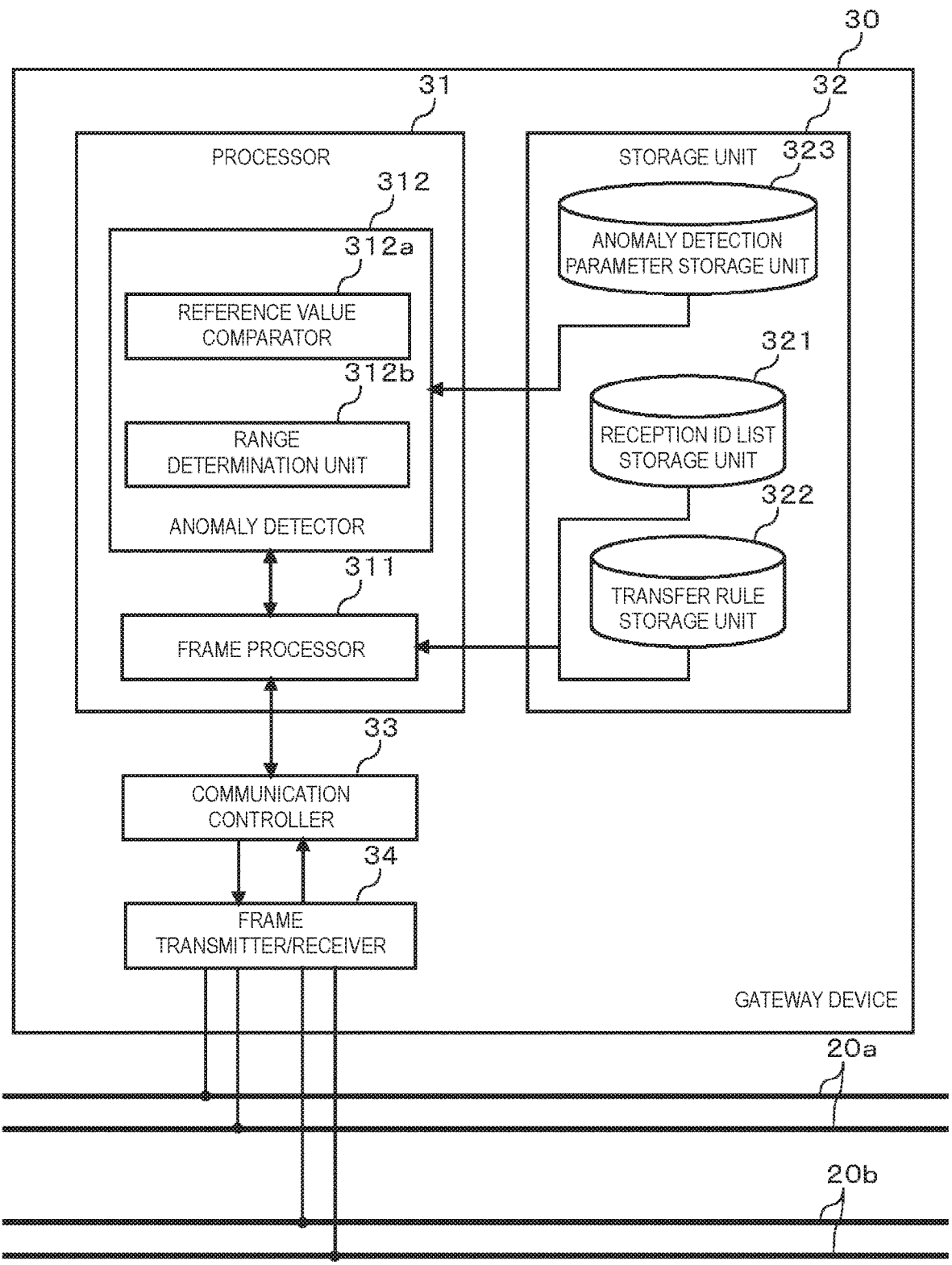
FIG. 3 is a block diagram showing a configuration of a gateway device.

FIG. 3 shows a configuration of gateway device 30. Gateway device 30 includes processor 31, storage unit 32, communication controller 33, and frame transmitter/receiver 34. Processor 31 includes frame processor 311 and anomaly detector 312. Storage unit 32 includes reception ID list storage unit 321, transfer rule storage unit 322, and anomaly detection parameter storage unit 323.

Processor 31 can be implemented by cooperation between hardware resources and software resources or by only hardware resources. As the hardware resources, it is possible to use a microcomputer, a digital signal processor (DSP), a field programmable gate array (FPGA), and other large scale integration circuits (LSIs). As software resources, it is possible to use programs such as an operating system, applications, and firmware. As storage unit 32, a volatile or non-volatile memory can be used. As communication controller 33, a CAN controller as dedicated hardware can be used. Note that a function of communication controller 33 can be integrated with processor 31. As frame transmitter/receiver 34, a CAN transceiver as dedicated hardware can be used.

Frame transmitter/receiver 34 transmits and receives frames complying with the CAN protocol to and from first bus 20a and second bus 20b. Frame transmitter/receiver 34 receives a frame bit by bit from bus 20, and transfers the frame to communication controller 33. In addition, frame transmitter/receiver 34 transmits a frame bit by bit to bus 20 in accordance with bus information acquired from communication controller 33.

Communication controller 33 interprets a frame acquired from frame transmitter/receiver 34, and maps the respective values constituting the frame into the respective fields in the CAN protocol. Communication controller 33 transfers the mapped values of the frame to frame processor 311.

Frame processor 311 acquires a value (message ID) of the ID field acquired from communication controller 33, and refers to a list of message IDs held in reception ID list storage unit 321 to determine whether to receive the frame. If the list includes the value of the ID field, frame processor 311 determines to receive the frame; otherwise, frame processor 311 determines not to receive the frame. Upon determining to receive the frame, frame processor 311 transfers the values of fields following the ID field to anomaly detector 312.

Upon determining that the frame acquired from frame transmitter/receiver 34 does not comply with the CAN protocol, communication controller 33 generates an error frame and transfers the error frame to frame transmitter/receiver 34. Frame transmitter/receiver 34 sends the error frame acquired from communication controller 33 to bus 20.

Frame processor 311 transfers the values (messages) of fields following the ID field acquired from communication controller 33 to anomaly detector 312, and requests anomaly detector 312 to determine whether the acquired message is an attack message.

Frame processor 311 decides which bus the frame is to be transferred based on the transfer rule held in transfer rule storage unit 322 and the message ID acquired from communication controller 33. Frame processor 311 notifies communication controller 33 of information (bus information) of the decided bus to which the frame is to be transferred, the message ID, and data.

Communication controller 33 generates a frame based on the message ID and the data acquired from frame processor 311, and transfers the bus information and the generated frame to frame transmitter/receiver 34. Frame transmitter/receiver 34 sends the frame acquired from communication controller 33 to bus 20 defined by the bus information.

Anomaly detector 312 includes reference value comparator 312a and range determination unit 312b, and determines whether a received message is a anomalous message. Details of anomaly detector 312 will be described later.

Reception ID list storage unit 321 holds a list of message IDs received by gateway device 30. Transfer rule storage unit 322 holds a transfer rule for each bus. Anomaly detection parameter storage unit 323 holds a parameter used for anomaly detection processing in anomaly detector 312.

Figures 4A, 4B:
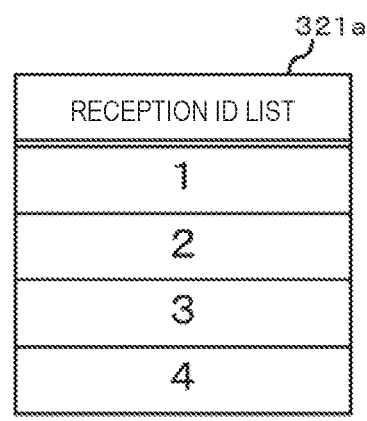
FIG. 4A is a view showing an example of a message ID list received by the gateway device.
FIG. 4B is a view showing an example of a transfer rule held by the gateway device.

FIG. 4A shows an example of a message ID list received by gateway device 30. Message ID list table 321a shown in FIG. 4A includes settings that make gateway device 30 receive frames whose message IDs are "1", "2", "3", and "4."

FIG. 4B shows an example of a transfer rule held by gateway device 30. Transfer rule table 322b shown in FIG. 4B includes settings (ID being indicated by "*") that make any frames received from first bus 20a be transferred to second bus 20b regardless of the message IDs. In addition, transfer rule table 322b includes settings (ID being indicated by "3") that make only a frame, of frames received from second bus 20b, whose message ID is "3" be transferred to first bus 20a.

Figure 5:
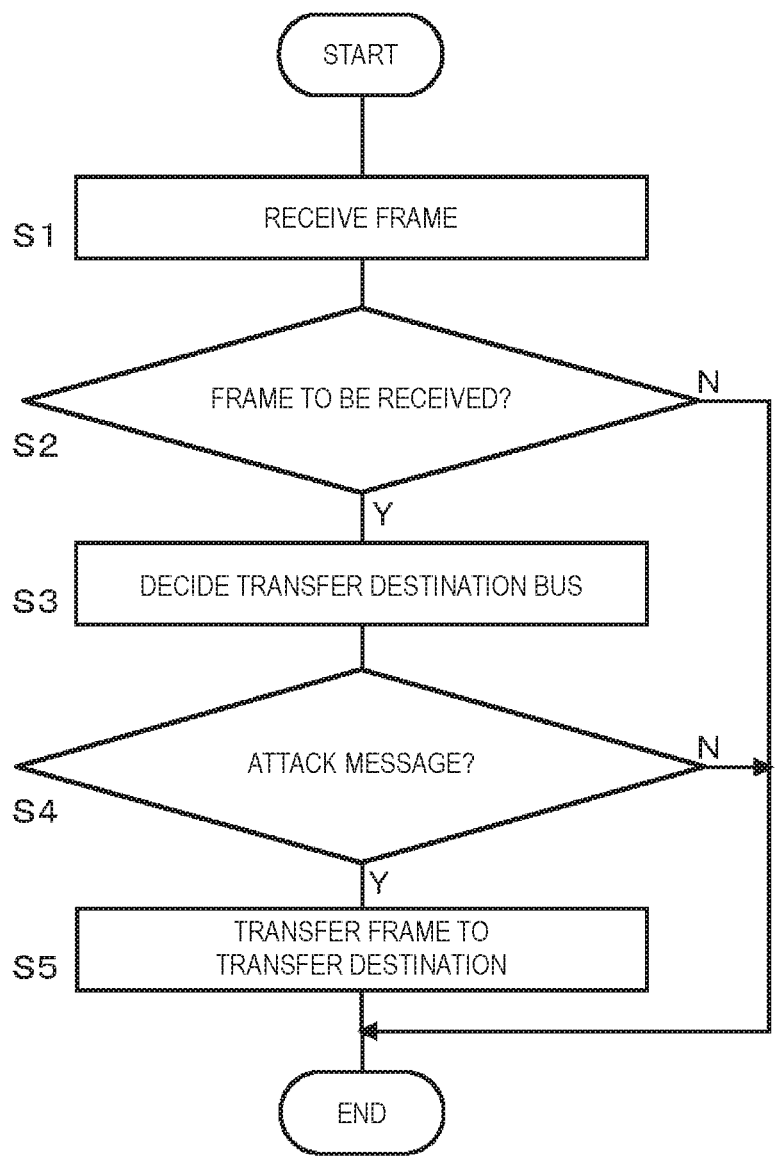
FIG. 5 is a flowchart showing frame transfer processing by the gateway device.

FIG. 5 is a flowchart showing frame transfer processing in gateway device 30. FIG. 5 explains how gateway device 30 performs the processing of transferring a frame received from first bus 20a to second bus 20b. Note that the processing of transferring a frame received from second bus 20b to first bus 20a is the same as the above processing, and hence a description of the processing will be omitted.

First, frame transmitter/receiver 34 receives a frame from first bus 20a (step S1). Frame transmitter/receiver 34 transfers a value of the ID field (message ID) of the received frame to communication controller 33. Communication controller 33 operates in cooperation with frame processor 311 to determine, based on the message ID of the received frame, whether the frame is a frame that requires reception processing (step S2).

Upon determining that the frame is the frame that requires reception processing (YES in step S2), communication controller 33 transfers values of the respective fields in the frame to frame processor 311. Frame processor 311 decides a transfer destination bus for the frame in accordance with the transfer rule held in transfer rule storage unit 322 (step S3).

Frame processor 311 notifies anomaly detector 312 of the values of the respective fields in the frame, and requests anomaly detector 312 to determine whether the frame is an attack message (anomalous message). Anomaly detector 312 determines, based on the acquired values of the respective fields, whether the frame is the attack message, and reports the determination result to frame processor 311 (step S4).

If anomaly detector 312 determines that the received frame is a normal message (YES in step S4), frame processor 311 requests communication controller 33 to transfer the frame onto the transfer destination bus decided in step S3. Upon receiving the request from frame processor 311, communication controller 33 transfers the frame to the designated transfer destination (step S5). More specifically, frame processor 311 transfers the values of the respective fields in the frame to communication controller 33, and communication controller 33 generates a frame and transfers the frame to frame transmitter/receiver 34. Frame transmitter/receiver 34 sends the acquired frame to designated bus 20.

Upon determining in step S2 that the received frame is a frame that does not require reception processing (NO in step S2) or determining in step S4 that the received frame is the attack message (NO in step S4), communication controller 33 does not transfer the frame.

Although the above flowchart indicates that after frame processor 311 decides a transfer destination (step S3), anomaly detector 312 determines whether the received frame is the attack message (step S4), the procedure is not limited to this sequence. After anomaly detector 312 determines whether the received frame is the attack message (step S4), frame processor 311 may decide a transfer destination (step S3), or decision of a transfer destination (step S3) and determination of whether the received frame is the attack message (step S4) may be simultaneously performed.

The anomaly detection processing by anomaly detector 312 will be described in detail below. When determining whether a received message is anomalous, reference value comparator 312a compares a target value with a reference parameter value to determine whether the message is anomalous. When determining whether the received message is anomalous, range determination unit 312b determines whether the target value is inside a reference parameter range.

Regarding a monitoring item used for determination by reference value comparator 312a, a correct answer value is uniquely determined with respect to the target value. Comparing a detected value of the monitoring item with a reference parameter value (fixed value) of the monitoring item makes it possible to uniquely determine whether the message has passed or failed with respect to the monitoring item in a formally specified manner. That is, if a detected value of a monitoring item coincides with a reference parameter value of the monitoring item, reference value comparator 312a determines that the message has passed; otherwise, reference value comparator 312a determines that the message has failed.

On the other hand, with regard to a monitoring item used for determination in range determination unit 312b, a passing criterion for a target value has some latitude. Such monitoring item corresponds to a monitoring item whose value fluctuates, such as a transmission period. For example, a value of a transmission period slightly changes due to a factor such as a traffic amount of a bus, disturbance noise, or the like.

Range determination unit 312b uses two reference parameter ranges in determination processing. The first reference parameter range is wider than the second reference parameter range. For example, the second reference parameter range is set to a range decided for each monitoring item considering a model and a destination based on the specifications of a vehicle manufacturer. The first reference parameter range is set to a range having a predetermined margin with respect to a lower and/or an upper limit of the second reference parameter range.

If a value detected based on a received frame is outside the first reference parameter range, range determination unit 312b determines that the frame has failed; otherwise, range determination unit 312b determines that the frame has passed. In addition, if the detected value is inside the first reference parameter range but is outside the second reference parameter range, range determination unit 312b determines that the frame is ambiguous.

FIG. 6 shows an example of anomaly detection parameter table 323a held in anomaly detection parameter storage unit 323. In the table shown in FIG. 6, monitoring items are classified into monitoring items as determination processing targets for reference value comparator 312a and monitoring items as determination processing targets for range determination unit 312b. Although FIG. 6 shows the two categories set in the same table, they may be set in different tables.

In the case shown in FIG. 6, three items, namely "ID", "data length", and "payload (fixed)", are defined as monitoring items as the determination processing targets for reference value comparator 312a.

Note that "ID" is an item for which reference value comparator 312a determines whether an ID of a received frame is registered in an ID list in which IDs of frames transmitted/received by gateway device 30 are registered. If the ID of the frame is registered in the ID list, reference value comparator 312a determines that the frame has passed; otherwise, reference value comparator 312a determines that the frame has failed. With regard to this monitoring item, it is necessary to collate the detected value (ID) with a plurality of reference parameter values (registered IDs) included in the list. Note that the IDs registered in the ID list may be IDs of frames transmitted and received to and from in-vehicle network system 5.

Note that "data length" is an item for which reference value comparator 312a determines whether a data length of a received frame coincides with a normal value defined for each ID. If the data length coincides with the normal value, reference value comparator 312a determines that the frame has passed; otherwise, reference value comparator 312a determines that the frame has failed. With regard to this monitoring item, reference value comparator 312a compares the detected value (data length) with one reference parameter value (defined data length).

Note that "payload (fixed)" is an item for which reference value comparator 312a determines whether a value (bit string) at a predetermined position in the data field is the same value as a value (bit string) defined in advance by specifications of a vehicle manufacturer. If both the values (bit strings) coincide with each other, reference value comparator 312a determines that the frame has passed; otherwise, reference value comparator 312a determines that the frame has failed. With regard to this monitoring item, reference value comparator 312a compares a detected value (bit string) with one reference parameter value (bit string). Note that when comparing bit strings at a plurality of positions in the data field, reference value comparator 312a compares a value (bit string) at each position.

In the case shown in FIG. 6, four items, namely "transmission period", "transmission frequency", "payload (variation)", and "payload (range)", are defined as monitoring items as the determination processing targets for range determination unit 312b.

Note that "transmission period" is an item for which range determination unit 312b determines whether a period of a received frame is inside a defined period range. If, for example, the defined period is 100 ms, a first reference parameter range (first period range) is set to 80 ms to 120 ms (margin: 20 ms (20%)), and a second reference parameter range (second period range) is set to 95 ms to 105 ms (margin: 5 ms (5%)). If the period of the received frame is outside the first period range, range determination unit 312b determines that the frame has failed, whereas if the period is inside the second period range, range determination unit 312b determines that the frame has passed. If the period is inside the first period range and is outside the second period range, range determination unit 312b determines that the frame is ambiguous. Note that a frame period is specified based on a time difference between a currently received frame and a previously received frame having the same message ID as that of the currently received frame.

Note that "transmission frequency" is an item for which range determination unit 312b determines whether a transmission frequency of a received frame is inside a defined transmission frequency range. If, for example, the defined transmission frequency is 100 frames per sec, a first reference parameter range (first transmission frequency) is set to 0 frame per sec to 110 frames per sec (margin: 10 frames (10%)), and a second reference parameter range (second transmission frequency) is set to 0 frame per sec to 105 frames per sec (margin: 5 frames (5%)). If the transmission frequency of the received frame is outside the first transmission frequency range, range determination unit 312b determines that the frame has failed, whereas if the transmission frequency is inside the second transmission frequency range, range determination unit 312b determines that the frame has passed. If the transmission frequency is inside the first transmission frequency range and is outside the second transmission frequency range, range determination unit 312b determines that the frame is ambiguous. Note that a transmission frequency of a frame is detected for each message ID.

Note that "payload (variation)" is an item for which range determination unit 312b determines whether a variation (absolute value) between a value of data of a data field in a currently received frame and a value of data of a data field in a previously received frame having the same message ID as that of the currently received frame is inside a defined variation (absolute value) range. For example, if data contained in the data field is an engine speed, a first reference parameter range (first variation range) is set to 0 rms to 100 rms, and a second reference parameter range (second variation range) is set to 0 rms to 80 rms. If the data variation of the data field in a received frame exceeds the first variation range, range determination unit 312*b* determines that the frame has failed, whereas if the data variation is less than the second variation range, range determination unit 312*b* determines that the frame has passed. If the data variation is equal to or less than the first variation range and is equal to or more than the second variation range, range determination unit 312*b* determines that the frame is ambiguous. Note that the first variation range and the second variation range are set to different ranges for the respective pieces of data as targets.

One data field sometimes contains a plurality of pieces of data (the engine speed, a vehicle speed, and the like). In this case, range determination unit 312*b* determines the above variation of each of the plurality of pieces of data with respect to one received frame. If any of data as payload (variation) determination targets contained in the data field of the frame has failed in the above variation determination, range determination unit 312*b* determines that the message has failed, whereas if all the data have passed, range determination unit 312*b* determines that the message has passed. If any of the target data is determined as being ambiguous and there is no data determined as having failed, range determination unit 312*b* determines that the message is ambiguous.

Note that "payload (range)" is an item for which range determination unit 312*b* determines whether a value of data of a data field in a received frame is inside a defined data value range. If, for example, data contained in the data field is the engine speed, a first reference parameter range (first data range) is set to 0 rpm to 7,000 rpm, and a second reference parameter range (second data range) is set to 0 rpm to 6,000 rpm. If a range of the data of the data field in the received frame exceeds the first data range, range determination unit 312*b* determines that the frame has failed, whereas if the range of the data is less than the second data range, range determination unit 312*b* determines that the frame has passed. If the range of the data is equal to less than the first data range and is equal to and more than the second data range, range determination unit 312*b* determines that the frame is ambiguous. Note that the first data range and the second data range are set to different ranges for the respective pieces of data as targets. Alternatively, the respective data ranges may change in accordance with situations.

One data field sometimes contains a plurality of pieces of data (the engine speed, the vehicle speed, and the like). In this case, range determination unit 312*b* performs the above data range determination with respect to each of the plurality of pieces of data in one received frame. If any of data as payload (range) determination targets contained in the data field of the frame has failed in the above variation determination, range determination unit 312*b* determines that the message has failed, whereas if all the data have passed, range determination unit 312*b* determines that the message has passed. If any of the target data is determined as being ambiguous and there is no data determined as having failed, range determination unit 312*b* determines that the message is ambiguous.

Figure 7:
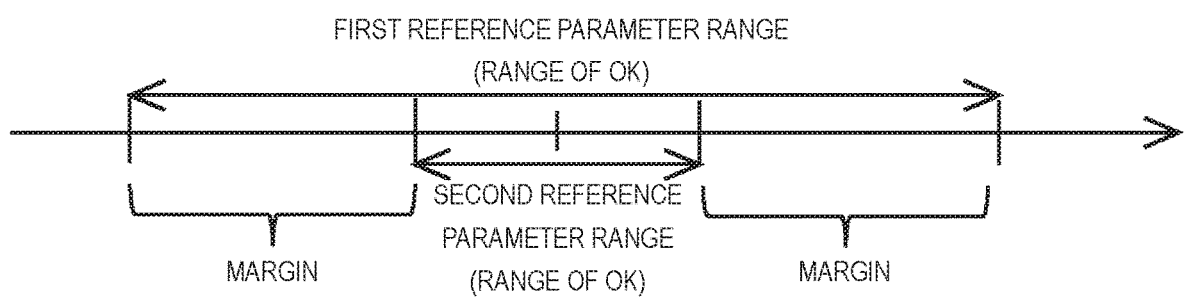
FIG. 7 is a view schematically illustrating a relationship between a first reference parameter range and a second reference parameter range.

FIG. 7 schematically shows a relationship between a first reference parameter range and a second reference parameter range. If a detected value is located in a margin range, range determination unit 312*b* determines, by using an additional determination criterion, whether a finally received message is a anomalous message. The additional determination criterion will be described later.

Figure 8:
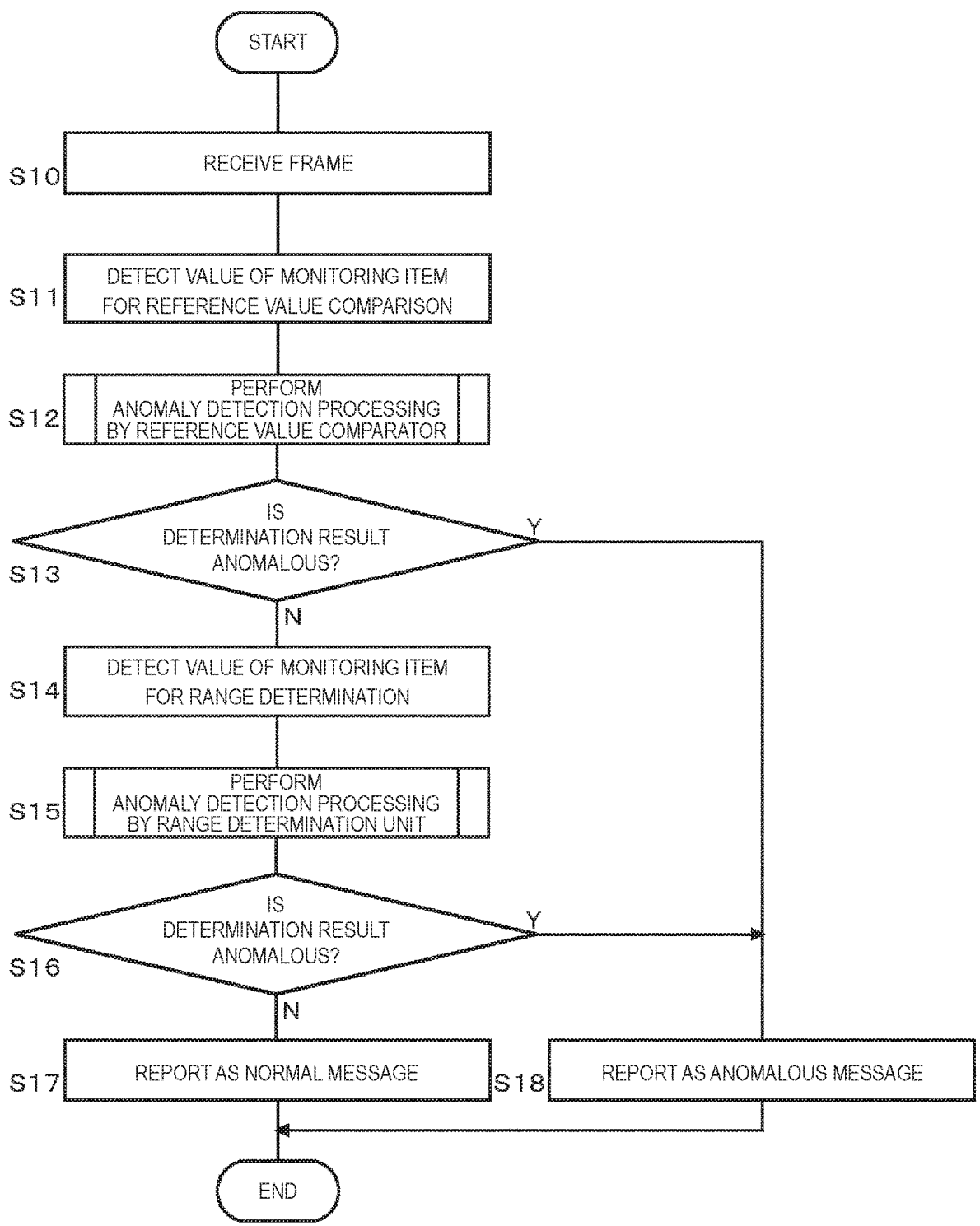
FIG. 8 is a flowchart showing anomaly detection processing by the gateway device.

FIG. 8 is a flowchart showing anomaly detection processing by gateway device 30. Frame transmitter/receiver 34 receives a frame from bus 20 (step S10). Frame transmitter/receiver 34 transfers a value of each field in the received frame to frame processor 311 via communication controller 33. The case shown in FIG. 8 is based on the assumption that a message ID of the frame is an ID contained in message ID list table 321*a* in reception ID list storage unit 321. Frame processor 311 requests anomaly detector 312 to perform anomaly detection processing with respect to the frame.

Reference value comparator 312*a* detects a value of a monitoring item for reference value comparison from the frame (step S11). Reference value comparator 312*a* performs the anomaly detection processing by using the detected value of the monitoring item and a reference parameter value of the monitoring item (step S12).

Figure 9:
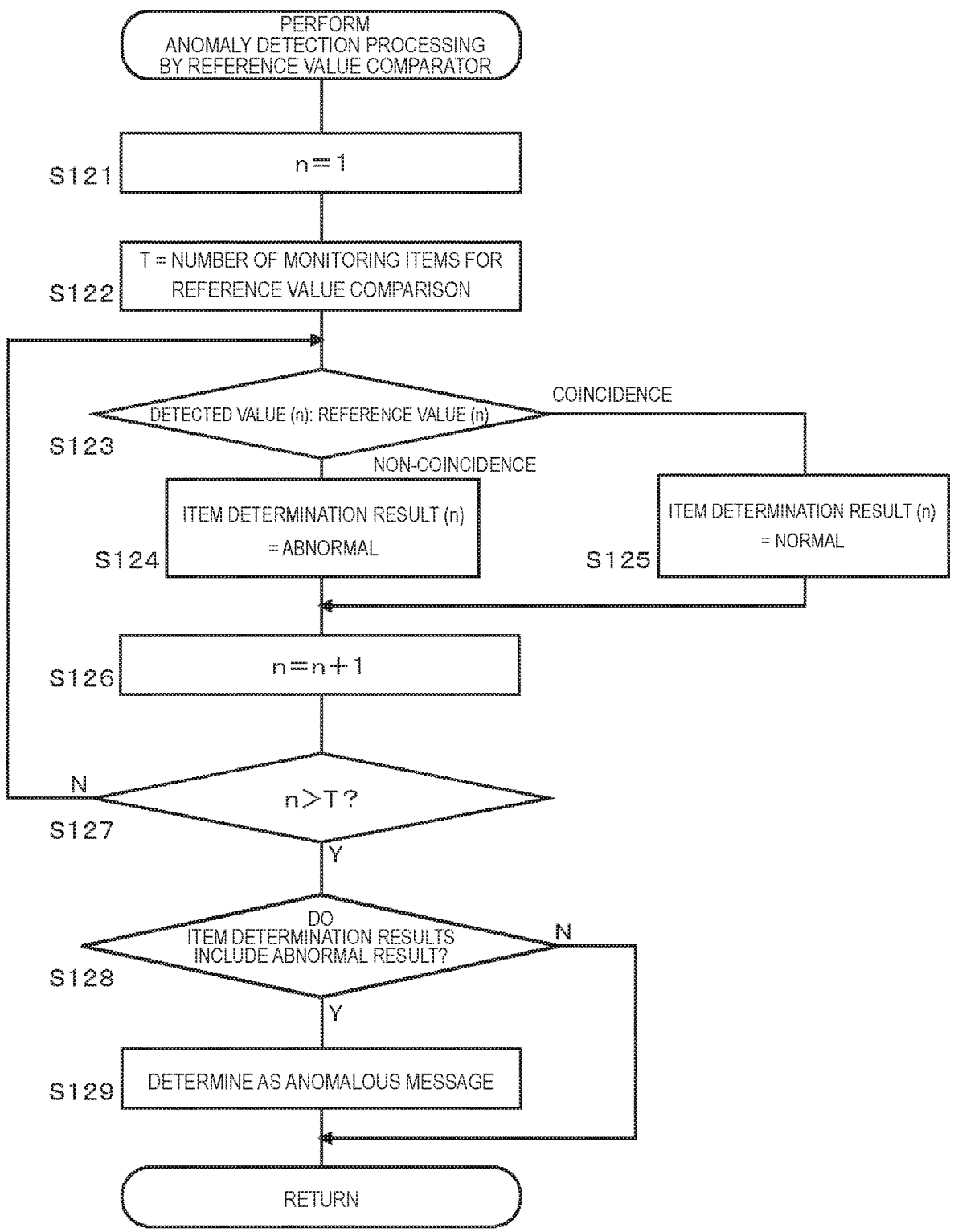
FIG. 9 is flowchart showing a subroutine of anomaly detection processing according to step S12 in FIG. 8.

FIG. 9 is a flowchart showing a subroutine for the anomaly detection processing according to step S12 in FIG. 8. Reference value comparator 312*a* sets parameter n used in this subroutine to 1 as an initial value (step S121), and sets constant T to a number of monitoring items for the reference value comparison (3 in the above case of "ID", "data length", and "payload (fixed)") (step S122).

Reference value comparator 312*a* compares a detected value of a monitoring item (n) with a reference parameter value of the monitoring item (n) (step S123). If the two values do not coincide with each other (no-coincidence in step S123), reference value comparator 312*a* sets an item determination result (n) to "abnormal" (step S124). If the two values coincide with each other (coincidence in step S123), reference value comparator 312*a* sets the item determination result (n) to "normal" (step S125).

Reference value comparator 312*a* increments parameter n (step S126), and determines whether parameter n exceeds constant T (step S127). If parameter n does not exceed constant T (NO in step S127), the process returns to step S123. If parameter n exceeds constant T (YES in step S127), reference value comparator 312*a* determines whether n item determination results include "abnormal" (step S128). If at least one of the results include "abnormal" (YES in step S128), reference value comparator 312*a* determines that the received message is an anomalous message (step S129). If the n item determination results do not include "abnormal" (NO in step S128), reference value comparator 312*a* does not determine that the received message is the anomalous message (that is, determines that the received message is a normal message).

Referring back to FIG. 8, if the determination result obtained by reference value comparator 312*a* indicates that the received message is the anomalous message (YES in step S13), anomaly detector 312 notifies frame processor 311 that the received message is the anomalous message (step S18), and terminates the processing.

If the determination result obtained by reference value comparator 312*a* indicates that the received message is not the anomalous message (NO in step S13), range determination unit 312*b* detects a value of a monitoring item for range determination from the frame (step S14). Range determination unit 312*b* performs the anomaly detection processing by using the detected value of the monitoring item and a reference parameter range of the monitoring item (step S15).

Figure 10:
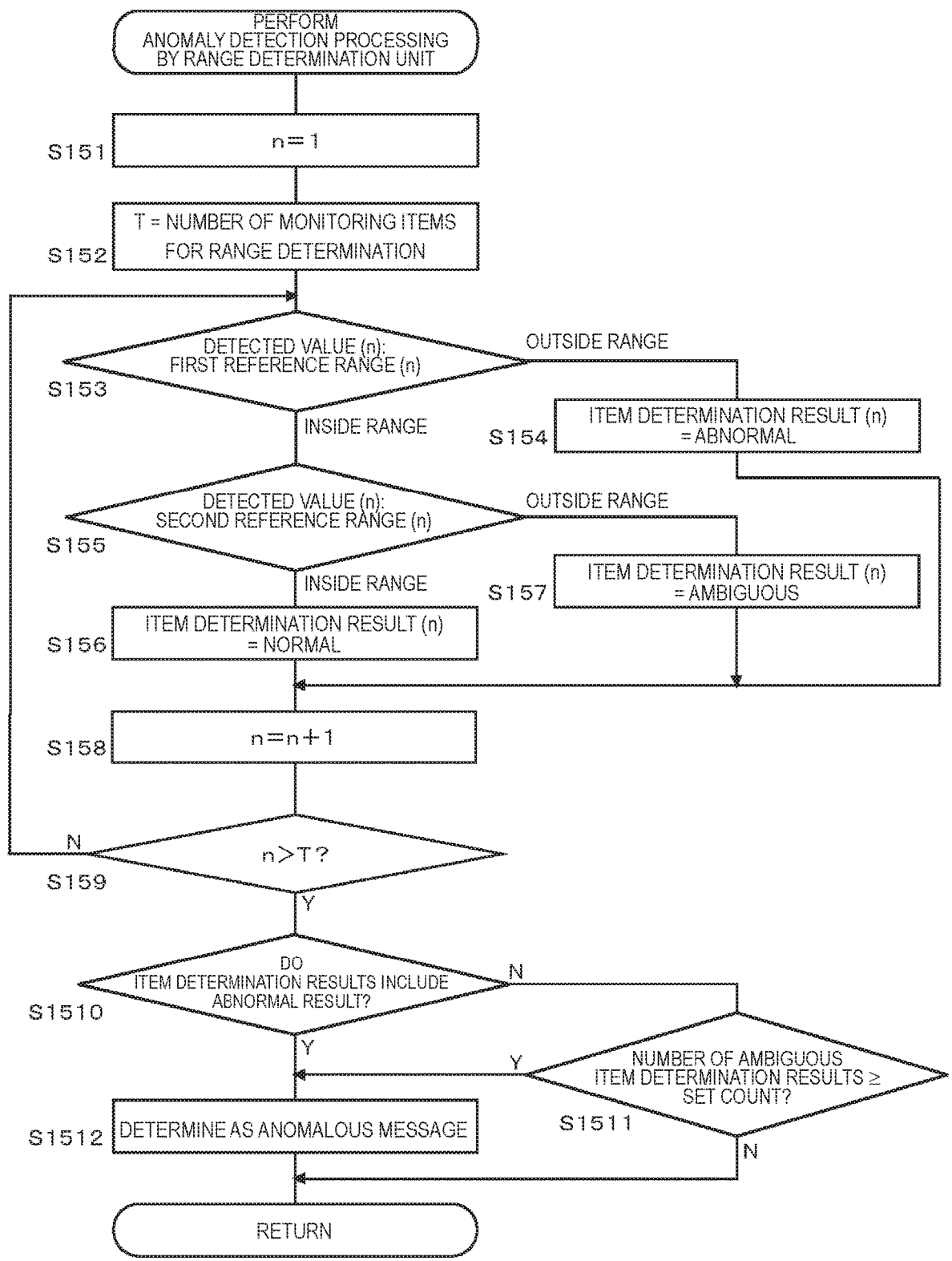
FIG. 10 is a flowchart showing a subroutine of anomaly detection processing according to step S15 in FIG. 8.

FIG. 10 is a flowchart showing a subroutine of the anomaly detection processing according to step S15 in FIG. 8. Range determination unit 312*b* sets parameter n used in this subroutine to 1 as an initial value (step S151), and sets constant T to a number of monitoring items for the range determination (4 in the above case of "transmission period", "transmission frequency", "payload (variation)", and "payload (range)" described above) (step S152).

Range determination unit 312b determines whether the detected value of the monitoring item (n) is inside a first reference parameter range (step S153). If the detected value is outside the first reference parameter range (outside the range in step S153), range determination unit 312b sets the item determination result (n) to "abnormal" (step S154). If the detected value is inside the first reference parameter range (inside the range in step S153), range determination unit 312b determines whether the detected value of the monitoring item (n) is inside a second reference parameter range of the monitoring item (n) (step S155). If the detected value is inside the second reference parameter range (inside the range in step S155), range determination unit 312b sets the item determination result (n) to "normal" (step S156). If the detected value is outside the second reference parameter range (outside the range in step S155), range determination unit 312b sets the item determination result (n) to "ambiguous" (step S157).

Range determination unit 312b increments parameter n (step S158), and determines whether parameter n exceeds constant T (step S159). If parameter n does not exceed constant T (NO in step S159), the process returns to step S153. If parameter n exceeds constant T (YES in step S159), range determination unit 312b determines whether the n item determination results include "abnormal" (step S1510). If at least one of the results includes "abnormal" (YES in step S1510), range determination unit 312b determines that the received message is the anomalous message (step S1512).

If the n item determination results do not include "abnormal" (NO in step S1510), range determination unit 312b determines whether the n item determination results include a set count or more of results indicating "ambiguous" (corresponding to the additional determination criterion) (step S1511). If the results include the set count (an integer equal to or more than 2 and equal to or less than T) or more of results indicating "ambiguous" (YES in step S1511), range determination unit 312b determines that the received message is the anomalous message (step S1512). If the results do not include the set count or more of results indicating "ambiguous" (NO in step S1511), range determination unit 312b does not determine that the received message is the anomalous message (that is, determines that the received message is the normal message).

Referring back to FIG. 8, if a determination result obtained by range determination unit 312b indicates that the received message is the anomalous message (YES in step S16), anomaly detector 312 notifies frame processor 311 that the received message is the anomalous message (step S18), and terminates the processing. If a determination result obtained by range determination unit 312b indicates that the received message is not the anomalous message (NO in step S16), anomaly detector 312 notifies frame processor 311 that the received message is the normal message (step S17), and terminates the processing.

According to the above description, in the anomaly detection processing by range determination unit 312b, if the number of monitoring items for which "ambiguous" is determined exceeds the set count even through there is no monitoring item for which abnormality is determined, range determination unit 312b determines that the received message is the anomalous message. With regard to this point, weighting may be performed in ambiguity determination for each monitoring item.

When performing ambiguity determination in step S155 in FIG. 10, range determination unit 312b sets "weights" for the item determination results (n) to perform weighting for each monitoring item. In step S1511 in FIG. 10, range determination unit 312b compares a total score obtained by totaling the respective item determination results with a threshold instead of comparing a number of "ambiguous" determinations included in n item determination results with the set count. If the total score exceeds the threshold, range determination unit 312b determines that the received message is the anomalous message; otherwise, range determination unit 312b determines that the received message is not the anomalous message.

Assume that weights of 0.8, 1.7, and 0.7 are respectively set for "transmission period", "transmission frequency", and "payload (variation)", and a threshold is set to 1.6. In this case, even if "ambiguous" is determined with respect to "transmission period" and "payload (variation)" (total score=1.5), the total score does not exceed the threshold (total score<1.6), the received message is not determined as the anomalous message. If "ambiguous" is determined only for "transmission frequency" (total score=1.7), because the total score exceeds the threshold (total score>1.6), the received message is determined as the anomalous message.

The above setting count, weights for the respective monitoring items, and threshold are set on the basis of experiments and/or simulation results, findings by a designer, and the like. The designer can adjust determination sensitivity by adjusting these values.

According to the flowchart shown in FIG. 10, in the anomaly detection processing, range determination unit 312b executes determination for all monitoring items for range determination (number of monitoring items=T) regardless of item determination results on the monitoring items (n), then determines whether the received message is the anomalous message, and reports the determination result to frame processor 311.

In this case, even if the number of item determination results equal to the number of monitoring items for range determination has not been obtained, range determination unit 312b may determine, in accordance with the item determination results on the monitoring items (n), whether the received message is the anomalous message, and terminate the anomaly detection processing.

Figure 11:
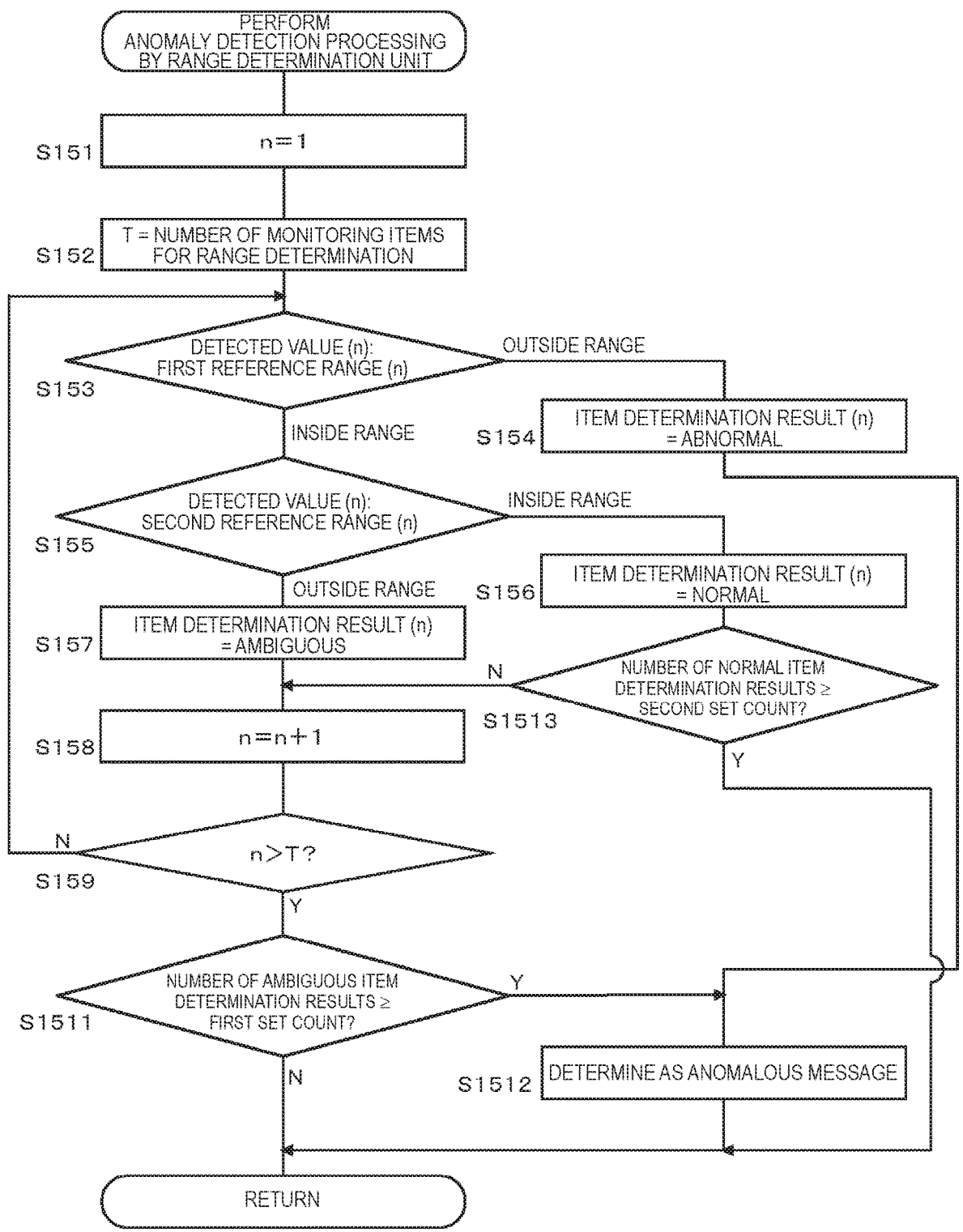
FIG. 11 is a flowchart showing a modification of the subroutine of the anomaly detection processing according to step S15 in FIG. 8.

FIG. 11 is a flowchart showing a modification of the subroutine of the anomaly detection processing according to step S15 in FIG. 8. Range determination unit 312b sets parameter n used in this subroutine to 1 as an initial value (step S151), and sets the number of monitoring items for range determination to the constant T (4 in the above case) (step S152).

Range determination unit 312b determines whether a detected value of the monitoring item (n) is inside a first reference parameter range of the monitoring item (n) (step S153). If the detected value of the monitoring item (n) does is not inside the first reference parameter range (is outside the range in step S153), range determination unit 312b sets an item determination result (n) to "abnormal" (step S154). In this case, range determination unit 312b determines that the received message is the anomalous message (step S1512), and terminates the anomaly detection processing.

If the detected value of the monitoring item (n) is inside the first reference parameter range (is inside the range in step S153), range determination unit 312b determines whether the detected value of the monitoring item (n) is inside a second reference parameter range of the monitoring item (n) (step S155). If the detected value of the monitoring item (n) does is not inside the second reference parameter range (is outside the range in step S155), range determination unit 312b sets the item determination result (n) to "ambiguous" (step S157).

If the detected value of the monitoring item (n) is inside the first reference parameter range (is inside the range in step S153) and also is inside the second reference parameter range (is inside the range in step S155), range determination unit 312b sets the item determination result (n) to "normal" (step S156). If n item determination results (before the item determination results (n)) include results determined as being "normal" which is equal to or more than a second set count (an integer equal to or more than 1 and equal to or less than T) (YES in step S1513), range determination unit 312b does not determine that the received message is the anomalous message, and terminates the anomaly detection processing.

If n item determination results (before the item determination results (n)) do not include the results determined as being "normal" which is equal to or more than the second set count (NO in step S1513), range determination unit 312b increments parameter n (step S158), and determines whether parameter n exceeds constant t (step S159). If parameter n does not exceed constant T (NO in step S159), the process returns to step S153.

If parameter n exceeds constant T (YES in step S159), range determination unit 312b determines whether the n item determination results include results determined as being "ambiguous" which is equal to or more than a first set count (corresponding to the additional determination criterion) (step S1511). If the determination results include the results determined as being "ambiguous" which is equal to or more than the first set count (an integer equal to or more than 2 and equal to or less than T) (YES in step S1511), range determination unit 312b determines that the received message is the anomalous message (step S1512). If the determination results do not include the results determined as being "ambiguous" which is equal to or more than the set count (NO in step S1511), range determination unit 312b does not determine that the received message is the anomalous message.

In this modification, if item determination results up to the monitoring item (n) include a predetermined number (second set count) of results determined as being "normal", it is possible to reduce a processing load in the anomaly detection processing by skipping the anomaly detection processing after the monitoring item (n+1) in an environment in which a normal message is transmitted and received. In the above case, in particular, if second set count=1 and a first item determination result (1) is "normal", the anomaly detection processing is immediately skipped, whereas if the first item determination result (1) is "ambiguous", the subsequent determination processing is continued.

It is also possible to improve the accuracy of detection of the anomalous message by changing a number of monitoring items (n) applied to the received message and an order of application of the monitoring items (n), in accordance with a type of the received message.

The flowchart shown in FIG. 8 exemplifies a case in which reference value comparator 312a executes the anomaly determination processing first, and then range determination unit 312b executes the anomaly determination processing if the above determination result obtained by the anomaly determination processing indicates that the received message is not the anomalous message. That is, if the determination result obtained by the anomaly determination processing by reference value comparator 312a indicates that the received message is the anomalous message, the anomaly determination processing by range determination unit 312b is skipped.

In this case, if specifications of hardware resources are high, for example, a central processing unit (CPU) has a plurality of cores, reference value comparator 312a and range determination unit 312b may concurrently execute processing as will be described in detail below.

Figure 12:
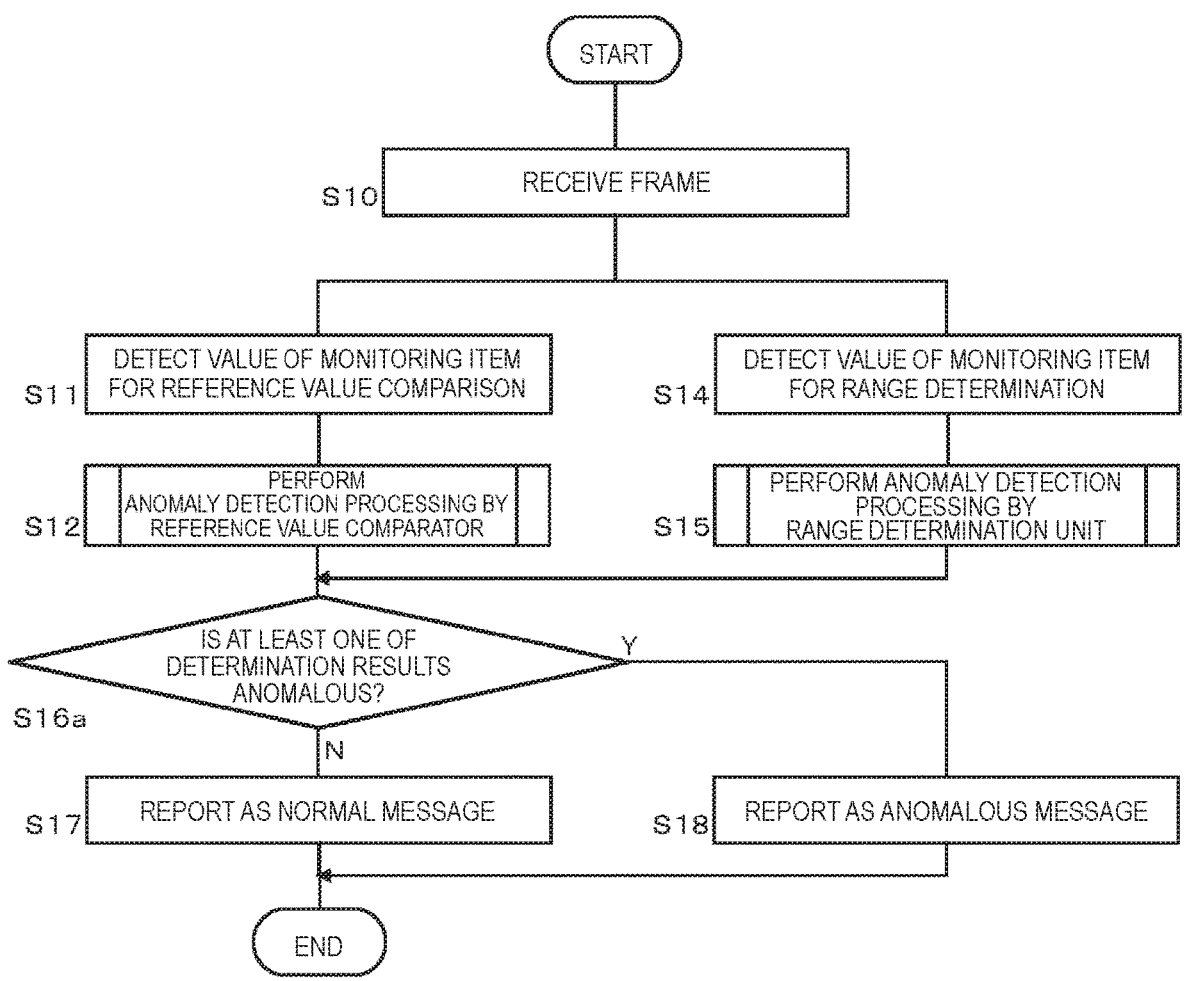
FIG. 12 is a flowchart showing a modification of the anomaly detection processing by the gateway device.

FIG. 12 is a flowchart showing a modification of the anomaly detection processing by gateway device 30. Frame transmitter/receiver 34 receives a frame from bus 20 (step S10). Frame transmitter/receiver 34 transfers a value of each field in the received frame to frame processor 311 via communication controller 33. The case shown in FIG. 12 is also based on the assumption that a message ID of the frame is an ID contained in message ID list table 321a in reception ID list storage unit 321. Frame processor 311 requests anomaly detector 312 to perform the anomaly detection processing with respect to the frame.

Reference value comparator 312a detects a value of a monitoring item for reference value comparison from the frame (step S11). Reference value comparator 312a performs the anomaly detection processing by using the detected value of the monitoring item and a reference parameter value of the monitoring item (step S12). Range determination unit 312b detects a value of a monitoring item for range determination from the frame (step S14). Range determination unit 312b performs the anomaly detection processing by using the detected value of the monitoring item and a reference parameter range of the monitoring item (step S15). According to the modification, processing associated with steps S11 and S12 is executed concurrently with processing associated with steps S14 and S15.

Anomaly detector 312 determines whether at least one of a determination result obtained by reference value comparator 312a and a determination result obtained by range determination unit 312b is a determination result indicating that the received message is the anomalous message (step S16a). If at least one of the determination results is the determination result indicating that the received message is the anomalous message (YES in step S16a), fraud detector 312 reports, to frame processor 311, information indicating that the received message is the anomalous message (step S18), and terminates the processing. If both the determination results indicate that the received message is not the anomalous message (NO in step S16a), anomaly detector 312 reports, to frame processor 311, information indicating that the received message is the normal message (step S17), and terminates the processing.

This modification makes range determination unit 312b always execute the anomaly detection processing, and hence a total computation amount is larger than the algorithm shown in FIG. 8, which has the possibility of skipping the processing. However, the modification can shorten the time until execution of final determination as compared with the algorithm shown in FIG. 8 in a case in which reference value comparator 312a does not determine, by the anomaly detection processing, that a target frame is the anomalous message, but range determination unit 312b determines, by the anomaly detection processing, that the frame is the anomalous message.

The above description has exemplified the case in which anomaly detector 312 is mounted in gateway device 30. However, the anomaly detector may be mounted in ECU 10.

Figure 13:
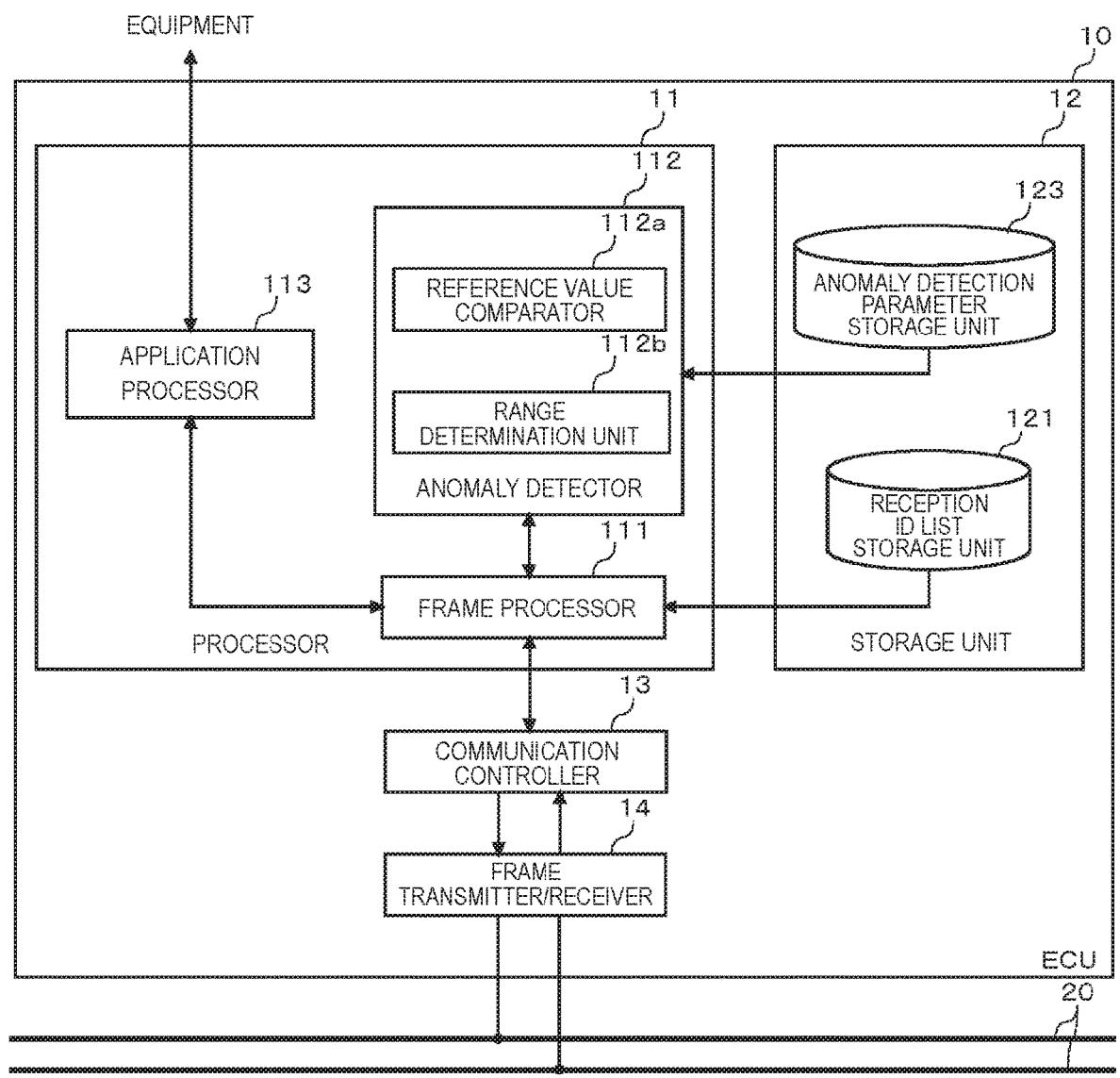
FIG. 13 is a block diagram showing a configuration of an electronic control unit (ECU) equipped with an anomaly detector.

FIG. 13 shows a configuration of ECU 10 equipped with anomaly detector 112. ECU 10 includes processor 11, storage unit 12, communication controller 13, and frame transmitter/receiver 14. Processor 11 includes frame processor 111, anomaly detector 112, and application execution unit 113. Storage unit 12 includes reception ID list storage unit 121 and anomaly detection parameter storage unit 123.

Processor 11 can be implemented by cooperation between hardware resources and software resources or by only hardware resources. As the hardware resources, it is possible to use a microcomputer, a DSP, a FPGA, and other LSIs. As the software resources, it is possible to use programs such as an operating system, applications, and firmware. As storage unit 12, a volatile or non-volatile memory can be used. As communication controller 13, a CAN controller as dedicated hardware can be used. Note that a function of communication controller 13 can be integrated with processor 11. As frame transmitter/receiver 14, a CAN transceiver as dedicated hardware can be used.

Frame transmitter/receiver 14 transmits and receives frames complying with the CAN protocol to and from bus 20. Frame transmitter/receiver 14 receives a frame bit by bit from bus 20, and transfers the frame to communication controller 13. In addition, frame transmitter/receiver 14 transmits a frame acquired from communication controller 13 bit by bit to bus 20.

Communication controller 13 interprets a frame acquired from frame transmitter/receiver 14, and maps the respective values constituting the frame into the respective fields in the CAN protocol. Communication controller 13 transfers the mapped values of the frame to frame processor 111.

Frame processor 111 acquires a value of the ID field (message ID) acquired from communication controller 13, and refers to a list of message IDs held in reception ID list storage unit 121 to determine whether to receive the frame. If the list includes the value of the ID field, frame processor 111 determines to receive the frame; otherwise, frame processor 111 determines not to receive the frame. Upon determining to receive the frame, frame processor 111 transfers the values of the fields following the ID field to anomaly detector 112.

Upon determining that the frame acquired from frame transmitter/receiver 14 does not comply with the CAN protocol, communication controller 13 generates an error frame and transfers the error frame to frame transmitter/receiver 14. Frame transmitter/receiver 14 sends the error frame acquired from communication controller 13 to bus 20.

Frame processor 111 transfers the values (messages) of fields following the ID field acquired from communication controller 13 to anomaly detector 112, and requests anomaly detector 112 to determine whether the acquired message is an attack message. A specific anomaly detection method is the same as that described with reference to FIGS. 8 to 12.

If anomaly detector 112 determines that the received message is a normal message, frame processor 111 transfers data of the received frame to application execution unit 113. Application execution unit 113 executes predetermined processing in accordance with the data. Details of the processing differ for each ECU 10.

For example, first ECU 10a in FIG. 1 has a function of generating an alarm when a vehicle speed exceeds 30 km/hr. Third ECU 100c has a function of generating an alarm when a vehicle door is open without braking.

Application execution unit 113 acquires a state of equipment or sensor connected to the ECU, and notifies frame processor 111 of the acquired state. Frame processor 111 notifies communication controller 13 of the message ID and data acquired from application execution unit 113. Communication controller 13 generates a frame on the basis of the message ID and the data acquired from frame processor 111, and transfers the generated frame to frame transmitter/receiver 14. Frame transmitter/receiver 14 sends the frame acquired from communication controller 13 to bus 20.

Note that when ECU 10 is configured so as not to perform the anomaly detection processing for messages, anomaly detector 112 in FIG. 13 is omitted. In addition, if ECU 10 is configured so as not to perform reception restriction based on message IDs of received frames, reception ID list storage unit 121 in FIG. 13 is omitted.

FIG. 13 explains a case in which anomaly detector 112 performs the anomaly detection processing for messages received by ECU 10. In this case, anomaly detector 112 may determine whether data acquired from connected equipment is anomalous. If, for example, ECU 10 is an ECU linked to a car navigation system, anomaly detector 112 determines whether a message transmitted from the car navigation system is an attack message. Upon determining that the message is the attack message, anomaly detector 112 stops sending the message from ECU 10 to bus 20.

As described above, according to this exemplary embodiment, upon determining that a detected value is inside the first reference parameter range but is outside the second reference parameter range, range determination unit 112b determines that the message is ambiguous, and determines, in accordance with a number of monitoring items for which ambiguity has been determined, whether the message is normal or anomalous. This makes it possible to accurately determine whether a message having a detected value in a gray zone is normal or anomalous, thereby reducing detection errors and detection omissions in a well-balanced manner. That is, it is possible to improve detection accuracy of a CAN filter.

The present invention has been described based on the exemplary embodiment. It is obvious for those skilled in the art that the exemplary embodiment is merely exemplary, the respective constituent elements or combinations of the respective processing processes can be variously modified, and such modifications is within the scope of the present invention.

The above exemplary embodiment has exemplified the case in which gateway device 30 executes the anomaly detection processing for frames as transfer targets to other buses 20. In this case, the anomaly detection processing may be executed for all frames received by gateway device 30.

The above exemplary embodiment has been described on the assumption that reference value comparator 312a (112a) is separated from range determination unit 312b (112b). However, reference value comparator 312a (112a) and range determination unit 312b (112b) may be integrated into one anomaly detector. In this case, the anomaly detector performs total final determination considering all anomaly detection processing results. For example, the anomaly detector may perform "normal/anomaly" determination based on "ID" and the number of ambiguity determinations with respect to the monitoring items for range determination.

The above exemplary embodiment has exemplified the determination method based on comparison with a reference parameter value as a fixed value, which is performed by reference value comparator 312a (112a). In this case, reference value comparator 312a (112a) may adopt range determination using a reference parameter range.

The above exemplary embodiment has also exemplified the in-vehicle network as an example of a network communication system that performs communication in accordance with the CAN protocol. The technique according to the present invention is not limited to usage in an in-vehicle network, and may be used in robots, networks for industrial equipment, network communication systems configured to perform communication in accordance with a CAN protocol other than the CAN protocol for in-vehicle networks, and the like.

Although the exemplary embodiment based on the CAN protocol has been described, this is not exhaustive. It is possible to use derivative protocols for CANs, such as CANOpen used for embedded systems of automation systems, a time-triggered CAN (TTCAN), or a CAN with Flexible Data Rate (CANFD), or other communication protocols (for example, Ethernet (registered trademark), MOST, and FlexRay) used for in-vehicle networks.

Note that the exemplary embodiment may be specified by the following items.

[Item 1]

Communication device (30) including communication unit (34) configured to transmit and receive a message in network (5), and first anomaly detector (312b) configured to detect an anomalous message by detecting values of a plurality of first monitoring items from a message received by communication unit (34) and determining whether each of the detected values of the plurality of first monitoring items is inside a corresponding reference range, wherein a first reference range and a second reference range narrower than the first reference range are set for each of the plurality of first monitoring items, and first anomaly detector (312b) determines that the message is the anomalous message, when any of the detected values is outside the first reference range, and determines that the message is the anomalous message, when any of the detected values is inside the first reference range and is outside the second reference range and when a predetermined rule is satisfied.

This makes it possible to accurately determine whether a frame having a detected value in a gray zone is normal or anomalous, thereby reducing detection errors and detection omissions in a well-balanced manner.

[Item 2]

Communication device (30) described in Item 1, wherein first anomaly detector (312b) determines that the message is the anomalous message, when the predetermined rule is satisfied such that a number of first monitoring items for which the detected values are inside the first reference range and are outside the second reference range is more than or equal to a predetermined count n, n being an integer greater than or equal to 2 and being less than or equal to a number of the plurality of first monitoring items.

This makes it possible to accurately determine whether a frame having a detected value in a gray zone is normal or anomalous by considering the number of monitoring items concerning the detected value in a gray zone.

[Item 3]

Communication device (30) described in Item 1 or 2, wherein when any of the detected values is outside the first reference range, first anomaly detector (312b) skips determination of whether the any of the detected values is inside the second reference range and determines that the message is the anomalous message, and when any of the detected values is inside the first reference range, the first anomaly detector determines whether the any of the detected values is inside the second reference range.

This makes it possible to reduce an overall processing amount.

[Item 4]

Communication device (30) described in any one of Items 1 to 3, wherein first anomaly detector (312b) determines whether any of the detected values is inside the second reference range, when the any of the detected values is inside the first reference range, first anomaly detector (312b) skips determination with respect to at least a next detected value, when the any of the detected value is determined as being inside the second reference range and a number of first monitoring items inside the second reference range is more than or equal to predetermined count m, m being an integer greater than or equal to 1 and being less than or equal to the number of the plurality of first monitoring items, and first anomaly detector (312b) continues determination with respect to the next detected value when the number of first monitoring items inside the second reference range is less than predetermined count m.

This makes it possible to reduce a processing amount while ensuring accuracy of detection of the anomalous message.

[Item 5]

Communication device (30) described in any one of Items 1 to 4 further including second anomaly detector (312a) configured to detect the anomalous message by detecting a value of at least one second monitoring item different from a monitoring item determined by first anomaly detector (312b) from the message and comparing each detected value of the at least one second monitoring item with a corresponding reference value, wherein second anomaly detector (312a) determines that the message is the anomalous message, when each detected value of the at least one second monitoring item does not coincide with the corresponding referenced value.

This makes it possible to adopt a suitable determination method for each monitoring item in accordance with a characteristic of the monitoring item.

[Item 6]

Communication device (30) described in Item 5, wherein when second anomaly detector (312a) determines that the message is the anomalous message, the determination by first anomaly detector (312b) is skipped, and the determination by the first anomaly detector is performed when the message is not determined as being the anomalous message.

This makes it possible to reduce an overall processing amount.

[Item 7]

A communication method in a communication device, the method including detecting an anomalous message by detecting values of a plurality of monitoring items from a message received from a network and determining whether each of the detected values of the plurality of monitoring items is inside a corresponding reference range, setting a first reference range and a second reference range narrower than the first reference range for each of the plurality of monitoring items, determining that the message is the anomalous message, when any of the detected values is outside the first reference range, and determining that the message is the anomalous message, when any of the detected values is inside the first reference range and is outside the second reference range and when a predetermined rule is satisfied.

This makes it possible to accurately determine whether a frame having a detected value in a gray zone is normal or anomalous, thereby reducing detection errors and detection omissions in a well-balanced manner.

[Item 8]

A communication program for causing a computer to execute detecting an anomalous message by detecting values of a plurality of monitoring items from a message received from a network and determining whether each of the detected values of the plurality of monitoring items is inside a corresponding reference range, wherein a first reference range and a second reference range narrower than the first reference range are set for each of the plurality of monitoring items, wherein in the detecting the anomalous message, the message is determined as the anomalous message, when any of the detected values is outside the first reference range, and in the detecting the anomalous message, the message is determined as the anomalous message, when any of the detected values is inside the first reference range and is outside the second reference range and when a predetermined rule is satisfied.

INDUSTRIAL APPLICABILITY

The present invention is useful in detecting anomalous messages in not just in-vehicle networks but also other networks.

REFERENCE MARKS IN THE DRAWINGS 1 vehicle
5 in-vehicle network system
10 ECU
41 engine
42 brake
43 door open/close sensor
44 window open/close sensor
20 bus
30 30 gateway device
31 processor
311 frame processor
312 anomaly detector
312a reference value comparator
312b range determination unit
32 storage unit
321 reception ID list storage unit
322 transfer rule storage unit
323 anomaly detection parameter storage unit
33 communication controller
34 frame transmitter/receiver

The invention claimed is:

1. A communication device comprising:
a processor; and
a memory including at least one program that, when executed by the processor, causes the processor to perform operations including:
receiving a message in a network; and
detecting an anomalous message by detecting values of a plurality of first monitoring items from the message and determining whether each of the detected values of the plurality of first monitoring items is inside a corresponding first reference range and a corresponding second reference range, the second reference range being narrower than the first reference range,
wherein
the processor detects the message as the anomalous message, when any of the detected values is outside the first reference range,
the processor detects the message as the anomalous message, when any of the detected values is inside the first reference range and is outside the second reference range and when a predetermined rule is satisfied,
the plurality of first monitoring items includes different types of items, and
the predetermined rule is satisfied when a number of monitoring items, out of the plurality of first monitoring items for which the detected values are inside the first reference range and are outside the second reference range, is at least equal to a predetermined count n, the predetermined count n being an integer at least equal to 2 and at most equal to a number of the plurality of first monitoring items.

2. The communication device according to claim 1, wherein
when any of the detected values is outside the first reference range, the processor detects the message as the anomalous message without determining whether the any of the detected values is inside the second reference range, and
when any of the detected values is inside the first reference range, the processor determines whether the any of the detected values is inside the second reference range.

3. The communication device according to claim 1, wherein
the processor determines whether any of the detected values is inside the second reference range, and
when the any of the detected values is inside the first reference range,
the processor skips determination with respect to at least a next detected value, when the any of the detected value is determined as being inside the second reference range and a number of monitoring items out of the plurality of first monitoring items inside the second reference range is at least equal to a predetermined count m, the predetermined count m being an integer at least equal to 1 and at most equal to the number of the plurality of first monitoring items, and
the processor continues determination with respect to the next detected value when the number of monitoring items inside the second reference range is less than the predetermined count m.

4. The communication device according to claim 1, further comprising a second processor configured to detect the anomalous message by detecting a value of at least one second monitoring item different from the plurality of first monitoring items from the message and comparing each detected value of the at least one second monitoring item with a corresponding reference value,
wherein the second processor detects the message as the anomalous message, when each detected value of the at least one second monitoring item does not coincide with the corresponding referenced value.

5. The communication device according to claim 4, wherein
the processor skips the determining when the second anomaly detector detects the message as the anomalous message, and
the processor performs the determining when the second anomaly detector does not detect the message as the anomalous message.

6. The communication device according to claim 1 wherein
the different types of items include a transmission period, a transmission frequency, a payload variation, and a payload range.

7. The communication device according to claim 1, wherein the different types of items are each included in the message and associated with a same message ID.

8. A communication method in a communication device, the communication method comprising:

receiving a message in a network; and detecting an anomalous message by detecting values of a plurality of monitoring items from the message received in the network and determining whether each of the detected values of the plurality of monitoring items is inside a corresponding first reference range and a corresponding second reference range, the second reference range being narrower than the first reference range, wherein in the detecting the anomalous message, the message is detected as the anomalous message, when any of the detected values is outside the first reference range, in the detecting the anomalous message, the message is detected as the anomalous message, when any of the detected values is inside the first reference range and is outside the second reference range and when a predetermined rule is satisfied, the plurality of first monitoring items includes different types of items, and the predetermined rule is satisfied when a number of monitoring items, out of the plurality of first monitoring items for which the detected values are inside the first reference range and are outside the second reference range, is at least equal to a predetermined count n, the predetermined count n being an integer at least equal to 2 and at most equal to a number of the plurality of first monitoring items.

9. A non-transitory storage medium storing a communication program that causes a computer to execute:

receiving a message in a network; and detecting an anomalous message by detecting values of a plurality of monitoring items from the message received in the network and determining whether each of the detected values of the plurality of monitoring items is inside a corresponding first reference range and a corresponding second reference range, the second reference range being narrower than the first reference range, wherein in the detecting the anomalous message, the message is detected as the anomalous message, when any of the detected values is outside the first reference range, in the detecting the anomalous message, the message is detected as the anomalous message, when any of the detected values is inside the first reference range and is outside the second reference range and when a predetermined rule is satisfied, the plurality of first monitoring items includes different types of items, and the predetermined rule is satisfied when a number of monitoring items, out of the plurality of first monitoring items for which the detected values are inside the first reference range and are outside the second reference range, is at least equal to a predetermined count n, the predetermined count n being an integer at least equal to 2 and at most equal to a number of the plurality of first monitoring items.

* * * * *